United States Patent
Raychowdhury et al.

(10) Patent No.: US 9,633,654 B2
(45) Date of Patent: Apr. 25, 2017

(54) LOW POWER VOICE DETECTION

(75) Inventors: Arijit Raychowdhury, Duluth, GA (US); Willem M. Beltman, West Linn, OR (US); James W. Tschanz, Portland, OR (US); Carlos Tokunaga, Hillsboro, OR (US); Michael E. Deisher, Hillsboro, OR (US); Thomas E. Walsh, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 13/997,070

(22) PCT Filed: Dec. 6, 2011

(86) PCT No.: PCT/US2011/063622
§ 371 (c)(1),
(2), (4) Date: Apr. 13, 2014

(87) PCT Pub. No.: WO2013/085499
PCT Pub. Date: Jun. 13, 2013

(65) Prior Publication Data
US 2014/0236582 A1 Aug. 21, 2014

(51) Int. Cl.
*G10L 25/00* (2013.01)
*G10L 15/20* (2006.01)
(Continued)

(52) U.S. Cl.
CPC ............ *G10L 15/20* (2013.01); *G06F 17/142* (2013.01); *G10L 21/0208* (2013.01);
(Continued)

(58) Field of Classification Search
CPC ...................................................... G10L 25/00
(Continued)

(56) References Cited

U.S. PATENT DOCUMENTS 5,519,879 A * 5/1996 Carmon .............. G06F 9/30167
708/318
5,625,828 A * 4/1997 Carmon .............. G06F 9/30167
375/261
(Continued)

FOREIGN PATENT DOCUMENTS

CN 101135928 A 3/2008
CN 101149928 A 3/2008
(Continued)

OTHER PUBLICATIONS

European Search Report for EP Patent Application No. 11876968.6, dated Jun. 22, 2015, 8 pages.
(Continued)

*Primary Examiner* — Michael N Opsasnick
(74) *Attorney, Agent, or Firm* — Jordan IP Law, LLC (57) ABSTRACT

Methods of enabling voice processing with minimal power consumption includes recording time-domain audio signal at a first clock frequency and a first voltage, and performing Fast Fourier Transform (FFT) operations on the time-domain audio signal at a second clock frequency to generate frequency-domain audio signal. The frequency domain audio signal may be enhanced to obtain better signal to noise ratio, through one or multiple filtering and enhancing techniques. The enhanced audio signal may be used to generate the total signal energy and estimate the background noise energy. Decision logic may determine from the signal energy and the background noise, the presence or absence of the human voice. The first clock frequency may be different from the second clock frequency.

25 Claims, 9 Drawing Sheets

(51) Int. Cl.
*G10L 25/84* (2013.01)
*G10L 21/0208* (2013.01)
*G10L 25/18* (2013.01)
*G06F 17/14* (2006.01)
*G10L 15/22* (2006.01)
*G10L 21/0232* (2013.01)
*G10L 15/28* (2013.01)
*G06F 1/32* (2006.01)

(52) U.S. Cl.
CPC ............. *G10L 25/18* (2013.01); *G10L 25/84* (2013.01); *G06F 1/3234* (2013.01); *G10L 15/22* (2013.01); *G10L 15/285* (2013.01); *G10L 21/0232* (2013.01); *G10L 2015/223* (2013.01); *G10L 2021/02087* (2013.01)

(58) Field of Classification Search
USPC .......................................... 704/205, 500–504
See application file for complete search history.

(56) References Cited

U.S. PATENT DOCUMENTS

| | | | | |
|---|---|---|---|---|
| 5,872,960 | A * | 2/1999 | Oz ...................... | G06F 9/30167 712/35 |
| 7,356,466 | B2 * | 4/2008 | Min ...................... | G10L 15/144 704/238 |
| 7,619,551 | B1 | 11/2009 | Wu | |
| 7,992,067 | B1 * | 8/2011 | Le Devehat ............ | H04L 9/065 375/328 |
| 8,225,112 | B2 * | 7/2012 | Koul ...................... | G06F 1/3203 386/353 |
| 9,097,783 | B2 * | 8/2015 | Mathews ................. | G01S 5/021 |
| 2004/0002862 | A1 * | 1/2004 | Kim ........................ | G10L 15/02 704/249 |
| 2007/0096781 | A1 * | 5/2007 | Ito ......................... | H02M 3/157 327/112 |
| 2008/0069364 | A1 | 3/2008 | Itou et al. | |
| 2008/0304670 | A1 | 12/2008 | Breebaart | |
| 2009/0154257 | A1 * | 6/2009 | Fujioka ................. | G11C 7/1051 365/189.05 |
| 2009/0210654 | A1 * | 8/2009 | Koul ...................... | G06F 1/3203 712/25 |
| 2010/0158137 | A1 | 6/2010 | Son et al. | |
| 2012/0117402 | A1 * | 5/2012 | Machnicki .............. | G06F 1/324 713/322 |
| 2012/0284546 | A1 * | 11/2012 | Koul ...................... | G06F 1/3203 713/322 |
| 2013/0315011 | A1 * | 11/2013 | Takahashi ................ | G11C 7/22 365/189.011 |

FOREIGN PATENT DOCUMENTS

| | | |
|---|---|---|
| CN | 101223490 A | 7/2008 |
| TW | 201007701 A1 | 2/2010 |
| TW | 201212007 A1 | 3/2012 |
| TW | 201212008 A1 | 3/2012 |
| WO | 2013/085499 A1 | 6/2013 |

OTHER PUBLICATIONS

Office Action and Search Report for Chinese Patent Application No. 201180075351.3 mailed on Aug. 7, 2015, 21 pages including 11 pages of English translation.

Lihui Geo et al., "A Low-Cost Robust Front-end for Embedded ASR System", International Symposium on Chinese Spoken Language Processing ISCLP 2006, Dec. 16, 2006, p. 1-9, Singapore.

Wei Han et al., "Multiplier-Less Based Parallel-Pipelined FFT Architectures for Wireless Communication Applications", ICASSP '05, IEEE International Conference on Acoustics, Speech, and Signal Processing, Jan. 1, 2005, pp. 45-48, vol. 5, Edinburgh, UK.

Lin Y-T. et al., "Low-Power variable-length fast Fourier transform processor", IEE Proceedings: Computers and Digital Techniques, Jul. 6, 2005, pp. 499-506, vol. 152, No. 4, Great Britain.

Arijit Raychowdhury et al., "A 2.3 nJ/Frame Voice Activity Detector-Based Audio Front-End for Context-Aware System-On-Chip Applications in 32-nm CMOS", IEEE Journal of Solid-State Circuits, Aug. 1, 2013, pp. 1963-1969, vol. 48, No. 8, Piscataway, New Jersey, USA.

International Search Report and Written Opinion received for PCT application No. PCT/US2011/063622, mailed on May 30, 2012, 8 pages.

Office Action received for Taiwan Patent Application No. 101144776, mailed on Aug. 1, 2014, 4 pages of Office Action and 3 pages of English Translation.

International Preliminary Report on Patentability and Written Opinion received for PCT Patent Application No. PCT/US2011/063622, mailed on Jun. 19, 2014, 5 pages.

Office Action for Chinese Patent Application No. 201180075351.3, mailed Apr. 21, 2016, 17 pages including 10 pages of English translation.

Decision on Rejection for Chinese Patent Application No. 201180075351.3, mailed Dec. 29, 2016, 20 pages including 13 pages Of English translation.

* cited by examiner

LOW POWER VOICE DETECTION

BACKGROUND

Technical Field

Embodiments generally relate to audio processing. More particularly, embodiments relate to voice recognition.

Discussion

Voice command and continuous speech recognition can be important for mobile computing systems due to limited keyboard functionality. However, the power cost of continuously listening for potential voices in the environment may be so high that most systems require an input from the user before the systems can start listening. This approach may be inconvenient and may limit the practicality of many potential applications.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve an apparatus which includes logic to store audio signal in time domain in a memory configured to operate based on a first clock frequency and a first voltage, and perform Fast Fourier Transform (FFT) operations on the audio signal in time domain based on a second clock frequency and a second voltage to generate audio signal in frequency domain.

Embodiments may involve a computer implemented method which includes recording time-domain audio signal at a first clock frequency and a first voltage. The method further includes performing Fast Fourier Transform (FFT) operations on the time-domain audio signal at a second clock frequency to generate frequency-domain audio signal. The first clock frequency may be faster than the second clock frequency.

Embodiments may include a computer readable storage medium having a set of instructions which, if executed by a processor, causes a computer to record time-domain audio signal at a first clock frequency and a first voltage, and to perform Fast Fourier Transform (FFT) operations on the time-domain audio signal at a second clock frequency to generate frequency-domain audio signal. The first clock frequency may be faster than the second clock frequency.

Figure 1:
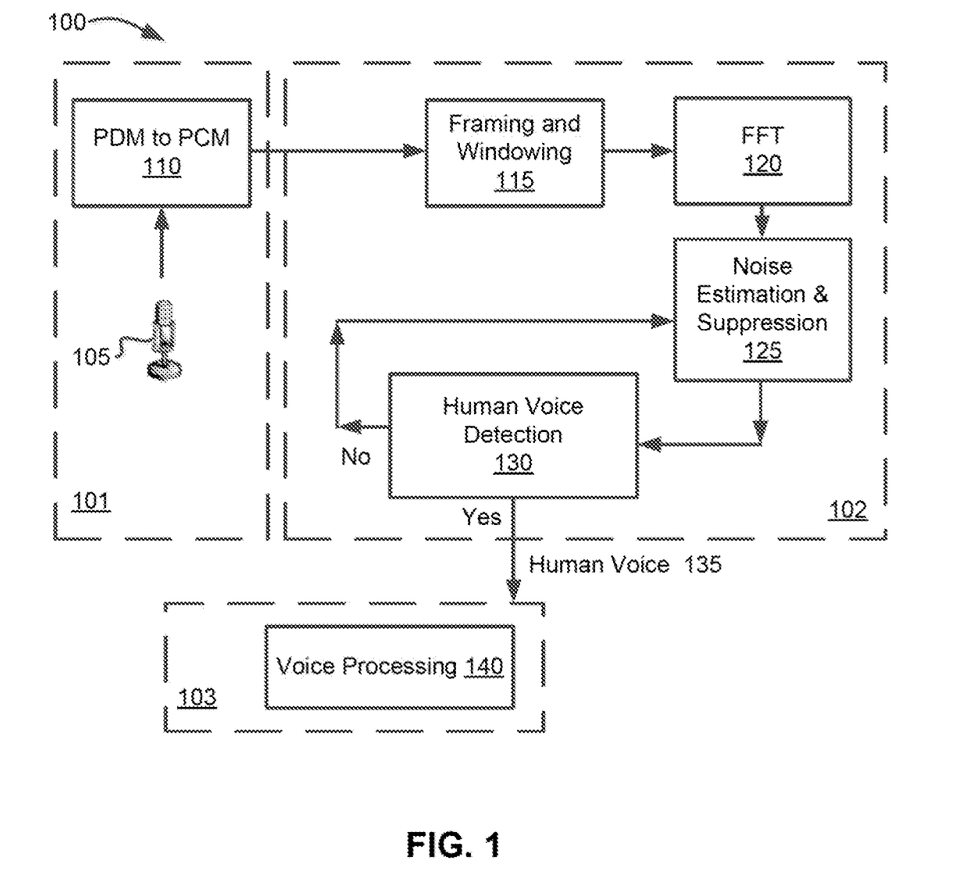
FIG. 1 is a block diagram that illustrates an example of an embodiment of a speech recognition system.

Turning to FIG. 1, a block diagram that illustrates an embodiment of a speech recognition system 100 is shown. The system may include a pre-processing module 101 configured to capture audio signal, a frontend processing module 102 configured to process the audio signal and detect any human voice information that may be included in the audio signal, and a backend processing module 103 configured to analyze the human voice information and perform operations associated with the human voice information. It may be noted that the audio signal may include background noise and the human voice information.

A pre-processing module 101 may include a recorder 105 (e.g., a microphone) which may be used to capture the audio signal as Pulse Density Modulation (PDM) information streams. The PDM stream may include audio signal in a digital format in time domain. The pre-processing module 101 may include a PDM to Pulse-code modulation (PCM) converter 110 configured to receive the PDM information streams and generate PCM information streams. The PCM information streams may be viewed as a digital representation of the PDM information streams. The PCM information streams include un-encoded or raw information. For some embodiments, the PCM data stream may be received directly. For example, the recorder 105 may include an integrated feature such that it generates the PCM information streams.

A frontend processing module 102 (also referred to as a voice activity detection or VAD module) may include a framing and windowing module 115 configured to frame and window the PCM information streams received from the PDM-PCM converter 110. The framing and windowing module 115 may frame and window the PCM information streams into multiple frames based on a sampling rate and a frame size (illustrated in FIG. 2). For example, a sampling rate may be set at 16 kHz, and a frame size may be set at 32 ms (milliseconds). Depending on the implementation, a different sampling rate and a different frame size may be used. For some embodiments, the frames may overlap one another with a non-overlapping window. For example, two consecutive frames each having a frame size of 32 ms may overlap one another by 22 ms with a non-overlapping window of 10 ms. Using the 16 kHz sampling rate and the 32 ms frame size examples, the number of samples per frame may be 16×32=512.

An FFT module 120 may be configured to receive the frames of the PCM information streams and perform necessary transformation of those frames from their time domain representation into a frequency domain representation. The frequency-domain representation of the audio signal may indicate energy or signal levels within each given frequency band over a range of frequencies (illustrated in FIG. 2). After the transformation operations are performed by the FFT module 120, a noise estimation and suppression module 125 may analyze each frame in the frequency domain representation and filter out any noise information that may not be within a same band as the human voice information. For some embodiments, the noise estimation and suppression module 125 may be implemented as a programmable band-pass filter. In general, the human voice may fall within a band approximately between 20 Hz and 7 KHz (referred to herein as a human voice band). The noise estimation and suppression module 125 may be configured to detect any energy or signal levels that may fall outside of the human voice band and suppress that energy as out-of-band energy.

There may be a difference between statistical properties of human voice and background noise. For some embodiments, the noise estimation and suppression module 125 may distinguish the human voice from the background noise based on an assumption that the human voice tends to be in a pattern of short bursts followed by pauses which may be illustrated as short burst of high amplitude energy followed by low amplitude energy. This energy pattern is different from the energy associated with background noise where the mean amplitude of the energy may tend to remain relatively the same or change very slowly from one period of time to another period of time. As a result, it may be possible to keep track and estimate the background noise over a period of time A human voice detection module 130 may be configured to use the background noise estimation to determine whether there is a presence of the human voice within the human voice band. For some embodiments, the human voice detection module 130 may determine the total energy within a frame in the frequency domain representation, compare that with the estimated noise energy, and determine whether there is a presence of the human voice within that frame. For example, when the total energy is larger than the background noise energy multiplied by a threshold, human voice information 135 may be present. When the total energy is approximately less than or equal to the background noise energy, the human voice information 135 may not be present. When the human voice information 135 is not present, the operations of the frontend processing module 102 may continue with the noise estimation and suppression of the next frame as performed by the noise estimation and suppression module 125.

The backend processing module 103 may include a voice processing module 140 configured to receive the human voice information 135 from the frontend processing module 102 and determine commands or instructions that may be included in the human voice information 135. The voice processing module 140 may cause operations to be performed based on the determined commands or instructions.

Figure 2:
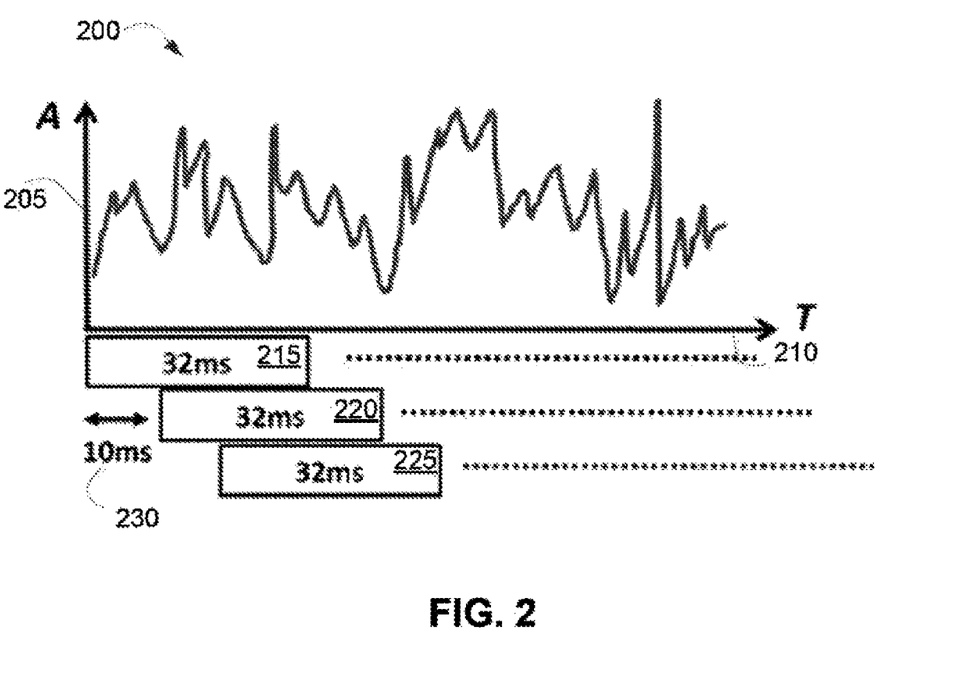
FIG. 2 is a chart that illustrates example energy and frames as related to the audio signal according to an embodiment.

Turning to FIG. 2, there is a chart 200 that illustrates example energy and frames as related to the audio signal. The chart 200 includes the energy of the audio signal that may be captured by the recorder 105 (illustrated in FIG. 1) over a period of time. The vertical axis 205 of the chart 200 may represent the amplitudes of the energy, and the horizontal axis 210 may represent time. For some embodiments, the audio signal may be divided into multiple overlapping frames such as, for example, the frames 215, 220 and 225. In this example, each of the frames 215, 220 and 225 may be associated with a window of 32 ms and may offset one another by a non-overlapping window 230 of 10 ms. The FFT module 120 (illustrated in FIG. 1) may first process the frame 215 which may be associated with a window that covers a time period from 0 ms to 31 ms. Ten milliseconds later, the FFT module 120 may process the second frame 220 which may be associated with a window that covers a time period from 10 ms to 41 ms. Then, ten milliseconds later, the FFT module 120 may process the third frame 225 which may be associated with a window that covers a time period from 20 ms to 51 ms.

Using a sample rate of 16 kHz, each of the frames 215, 220 and 225 may include 512 samples. Depending on the selected sampling rate and frame size, the number of samples may vary but may usually be a number that is a power of two. For some embodiments, the FFT module 120 (FIG. 1) may be expected to complete its transformation operations (from the time domain representation to the frequency domain representation) for each frame within a time period that is similar to the size of the non-overlapping window (e.g., 10 ms). In other embodiments, the FFT module may be expected to complete its transformation in the fraction of the time of the non-overlapping window. For example, the FFT module may only need 10% of 10 ms (or 1 ms) to complete its processing. The operations of the FFT module may be represented by the following formula:

$$X(k)=FFT(X(t)) \qquad \text{Formula 1}$$

with $X(k)$ representing the frequency domain representation of the audio signal, $X(t)$ representing the time domain representation of the audio signal, k ranging from a value of 1 to a total number of frequency bands (e.g., 512), and t representing time. The result of the Formula 1 may be a 512 point FFT (based on the 512 samples example). The result from the FFT operations may then be filtered by the noise estimation and suppression module 125 (illustrated in FIG. 1) to remove any out-of-band noise. The filtering operations of the noise estimation and suppression module 125 may be represented by the following formula:

$$Y(k)=H(k)*X(k) \qquad \text{Formula 2}$$

With $Y(k)$ representing the result after the filtering operations, $H(k)$ representing the filtering functions, $X(k)$ representing the frequency domain representation of the audio signal, and k ranging from a value of 1 to the total number of frequency bands (e.g., 512). The filtering operations may be performed by applying the filters to $X(k)$ in the frequency domain representation to remove any out-of-band noise.

Figure 3:
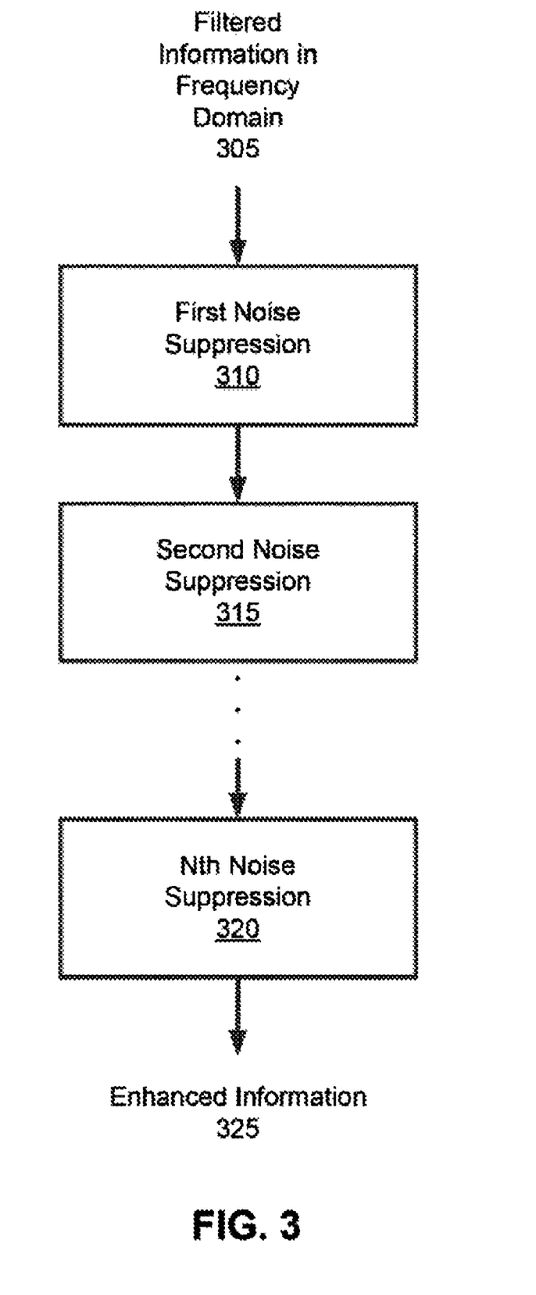
FIG. 3 is a block diagram that represents an example embodiment of noise suppression.

Turning to FIG. 3, shown is a block diagram that represents an example embodiment of noise suppression. Once the filter operations are completed, one or more noise suppression operations may be applied to remove or suppress any noise that may not be the human voice. For some embodiments, each noise suppression operation may be associated with a different noise suppression technique. There may be many different techniques that may be combined to perform the noise suppression operations. Referring to FIG. 3, filtered information 305 may be transmitted to a first noise suppression module 310. It may be noted that the filtered information 305 may be transmitted to the first noise suppression module 310 as a series of frames with each frame having the same frame size. The resulting information from the first noise suppression module 310 may be transmitted to a second noise suppression module 315, and so on, until the enhanced audio signal (referred to herein as enhanced audio information) 325 may be generated by the Nth noise suppression module 320. For example, the first noise suppression module 310 may be based on a technique referred to as delay and sum beam formers with fixed coefficients, and the second noise suppression module 315 may be based on a technique referred to as spectral tracking and sub-band domain Wiener filtering. It may be possible that the enhanced audio information 325 may have a higher signal to noise ratio than the incoming audio signal after the completion of the noise suppression operations illustrated in FIG. 3.

The enhanced audio information 325 may include a series of frames with each frame having the same frame size. The enhanced audio information 325 may be processed to detect the presence of the human voice by the human voice detection module 130 illustrated in FIG. 1. Depending on the implementation, the processing of the enhanced audio information 325 may vary. Following is a pseudo code example of a first algorithm that may be used by the human voice detection module 130 to process the enhanced audio information 325:

Task 1: For each frame of the enhanced audio information 325, determine the total energy L(n) as:

$$L(n)=(abs(\text{FFT Output})*H)^2$$

where "abs" is an absolute function, "FFT Output" is the result of the FFT module 120, and H is a filtering function.

Task 2: For each frame of the enhanced audio information 325, estimate the energy of the background noise (or noise floor energy) Lmin(n) as:

```
If(L(n) > Lmin(n−1))
    Lmin(n)=(1−A) * Lmin(n−1)+A * L(n);
Else
    Lmin(n)=(1−B) * Lmin(n−1)+B * L(n);
End
``` where A and B are parameters having constant values, Lmin(n) is the background noise energy of the current frame, and Lmin(n−1) is the background noise energy of the previous frame.

Task 3: For each frame of the enhanced audio information 325, determine the
presence of the human voice V(n). Where the human voice is present, set V(n)=1, and when the human voice is not present, set V(n)=0. This determination may be performed by comparing the total power L(n) determined in task 1 of the first algorithm with the floor energy of the background noise Lmin(n) determined in task 2 of the first algorithm.

```
If(L(n) < Lmin(n) * Tdown)
    V(n)= 0;
Elseif (L(n) > Lmin(n) * Tup OR silentframe < 4)
    V(n)= 1;
Else
    V(n)=V(n−1);
    If(L(n) < Lmin(n) * Tdown)
        silentframe++;
        speechframe=0;
    Elseif (L(n) > Lmin(n) * Tup)
        silentframe=0;
        speechframe++;
``` where Tup and Tdown are parameters having constant values.

Following is a pseudo code example of a second algorithm that may be used by the human voice detection module 130 to process the enhanced audio information 325. The second algorithm may be somewhat similar to the first algorithm with the additional functions of filtering and contour tracking operations.

Task 1: For each frame of the enhanced audio information 325, determine the total energy L(n) as:

$$L(n)=(abs(\text{FFT Output})*H)^2$$

where "abs" is an absolute function, "FFT Output" is the domain frequency representation result of the FFT module 120, and H is a filtering function.

Task 2: For each frame of the enhanced audio information 325, apply median filtering function H(n) to remove any high frequency noise and contour tracking function CT(n) to remove any sudden burst of noise and to determine an average energy per frame.

$$H(n)=\text{medianfilter}(L(n-S):L(n))$$

$$CT(n)=\text{mean}(H(n-4):H(n))$$

Task 3: For each frame of the enhanced audio information 325, determine the presence of the human voice V(n). When the human voice is present, set V(n)=1 and when the human voice is not present, set V(n)=4. This determination may be performed by comparing the total energy L(n) determined in task 1 of the second algorithm with the result of the contour tracking operations CT(n) determined in task 2 of the second algorithm.

```
If(L(n) < CT(n) * DB)
    V(n) − 0;
Elseif (L(n) > CT(n) * DB OR silentframe < 4)
    V(n) = 1;
If(L(n) < Lmin(n) * Tdown) silentframe++;
    speechframe = 0;
Elseif (L(n) > Lmin(n) * Tup)
    Silentframe = 0;
    speechframe++;
``` where Tup and Tdown are parameters having constant values, and the values of Tup and Tdown may vary depending on the implementation.

It may be noted that the efficiency of the first and second algorithms may depend on the background noise conditions. The first algorithm may perform better when there is uniform background noise. The second algorithm may perform better when the background noise includes spurious high frequency noise that is not part of the human voice.

Figure 4:
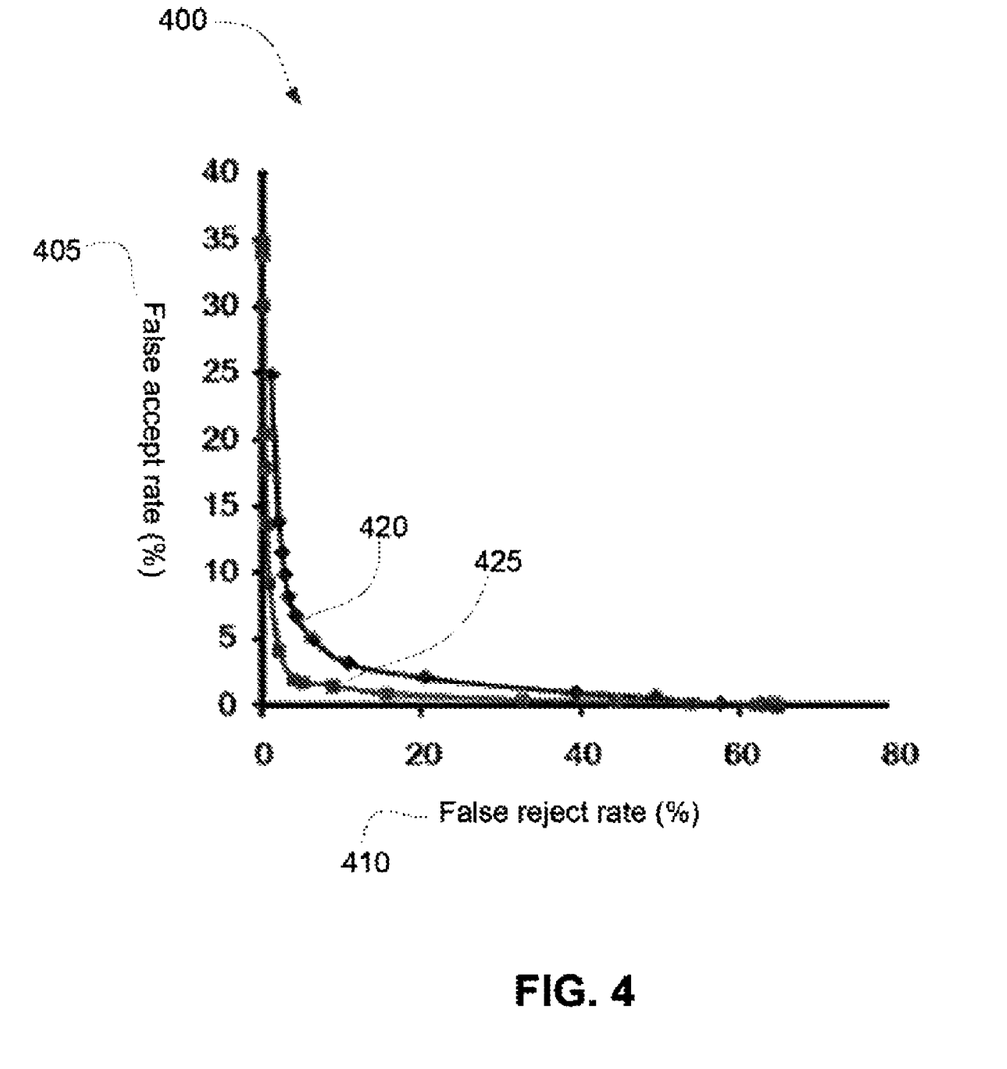
FIG. 4 is a chart that illustrates example false acceptance and false rejection rates associated with human voice detection operations.

Turning to FIG. 4, there is a chart 400 that illustrates example false acceptance and false rejection rates associated with the human voice detection operations. In processing the enhanced audio information 325 to determine whether the human voice is present, two potential types of error may occur. The first type of error (referred to as false reject error) may be related to rejecting audio signal that may include the human voice. The second type of error (referred to as false acceptance error) may be related to accepting noise as the human voice when that noise may not include the human voice. For some embodiments, a false reject rate and a false acceptance rate may be controlled using one or more threshold parameters. For example, when a threshold parameter is set to a low value, all of the noises may be accepted as the human voice; when the threshold parameter is set to a high value, all of the noises are rejected as not including the human voice. By programming the one or more threshold parameters, different operating points may be achieved. Referring to the example first and second algorithms described above, the threshold parameters may include "A", "B", "DB", "Tup" and "Tdown".

The illustrated example chart 400 includes a vertical axis 405 representing a false acceptance rate and a horizontal axis 410 representing a false acceptance rate for a frame of the enhanced audio information 325. A curve 420 may represent the operating points associated with the first algorithm described above, whereas a curve 425 may represent the operating points associated with the second algorithm described above. Each dot on the curves 420 and 425 may therefore represent an operating point. In this example, the background noise may be 5 dB. It may be noted that the false acceptance rate and the false rejection rate associated with the curve 425 are generally lower than those associated with the first algorithm. This may be attributed to the additional operations of the mean filtering and contour tracking functions.

Figure 5:
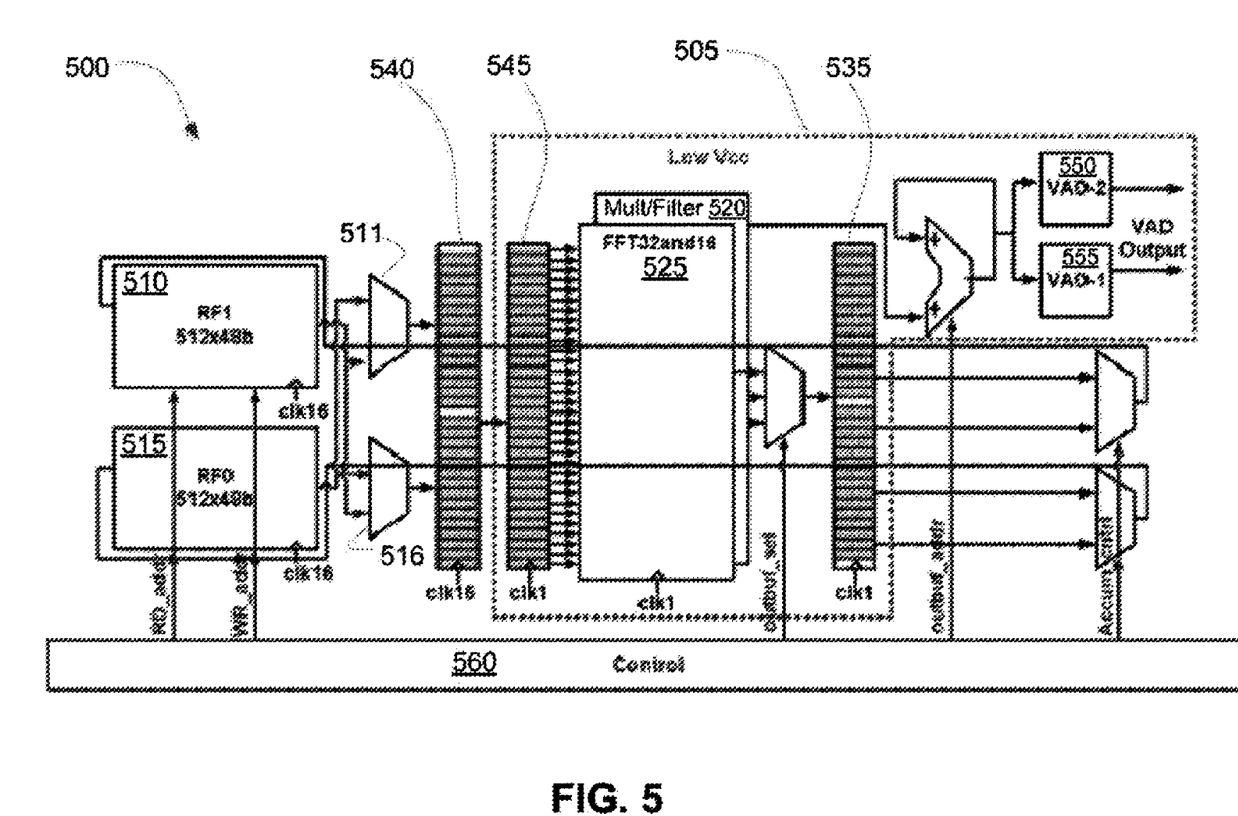
FIG. 5 is an example of a hardware architecture embodiment of a voice activity detection module.

Turning to FIG. 5, a hardware architecture embodiment of a voice activity detection module is illustrated. Diagram 500 may include some components that correspond to the components included in the frontend processing module 102 (illustrated in FIG. 1). For some embodiments, the windowing and framing module 115 of FIG. 1 may be implemented in software, and therefore is not included in the diagram 500. The components of the frontend processing module 102 that may be included in the diagram 500 are the FFT module 120, the noise estimation and suppression module 125 and the human voice detection module 130.

It may be noted that there are two sections in the diagram 500. The first section includes the components located inside the dotted block 505. The second section includes the components located outside of the dotted block 505. For some embodiments, the components located inside the dotted block 505 may be configured to operate at a low voltage (low Vcc), and they may be configured to operate at a slow clock frequency (referred to as clock 1). The components located outside the dotted block 505 may be configured to operate at a high voltage (high Vcc), and they may be configured to operate at a fast clock frequency (e.g., 16 times the clock frequency, referred to as clock 16). The components located inside the dotted block 505 may include an FFT module 525 and a multiplication and filtering module 520, and voice activity detection modules 550 and 555. The FFT module 525 may correspond to the FFT module 120 of FIG. 1, the multiplication and filtering module 520 may correspond to the noise estimation and suppression module 125 of FIG. 1, and the voice activated detection modules 550 and 555 may correspond to the human voice detection module 130 of FIG. 1.

Information associated with the audio signal in the time domain representation may be stored in memory modules 510 and 515. In this example, each of the memory modules 510 and 515 may include 512 lines with each line being 48 bits. As such, the total size of the memory may be 2×512×48 bits. When the information is read from the memory modules 510 and 515, the information may be transmitted via the multiplexers 511 and 516 to a frame buffer 540 and then to a frame buffer 545. It may be noted that the frame buffer 540 is located outside of the dotted block 505 and the frame buffer 545 is located inside the dotted block 505. As such, the frame buffer 540 may operate at a higher voltage and higher clock frequency (e.g., clock 16) than the frame buffer 545.

The FFT module 525 may be configured to operate as a 32-point FFT or a 16-point FFT module, wherein the configuration of the FFT module 525 may be controlled by the control module 560. The FFT module 525 may process the information received from the memory modules 510 and 515 to transform the information from the time domain representation to the frequency domain representation. The multiplication and filtering module 520 may receive the results from the FFT module 525 and perform noise filtering and noise suppression operations to generate the enhanced audio information 325 (illustrated in FIG. 3). The enhanced audio information 325 may then be stored in a frame buffer 535, wherein the enhanced audio information 325 may then be processed by the voice activity detection module 550 or 555. Depending on the implementation, there may be multiple voice activity modules operating in parallel. Each of the voice activity detection modules 550 and 555 may operate using a different algorithm (e.g., the first or second algorithm described above.) As mentioned, the components located inside the dotted block 505 may be configured to operate in the low frequency (or clock 1) and at a low voltage (low Vcc). The components located outside of the dotted block 505 may operate in the high frequency (or clock 16) and at a high voltage (or high Vcc). This may be significant because it may enable the components located inside the dotted block 505 to consume little power.

Figure 6:
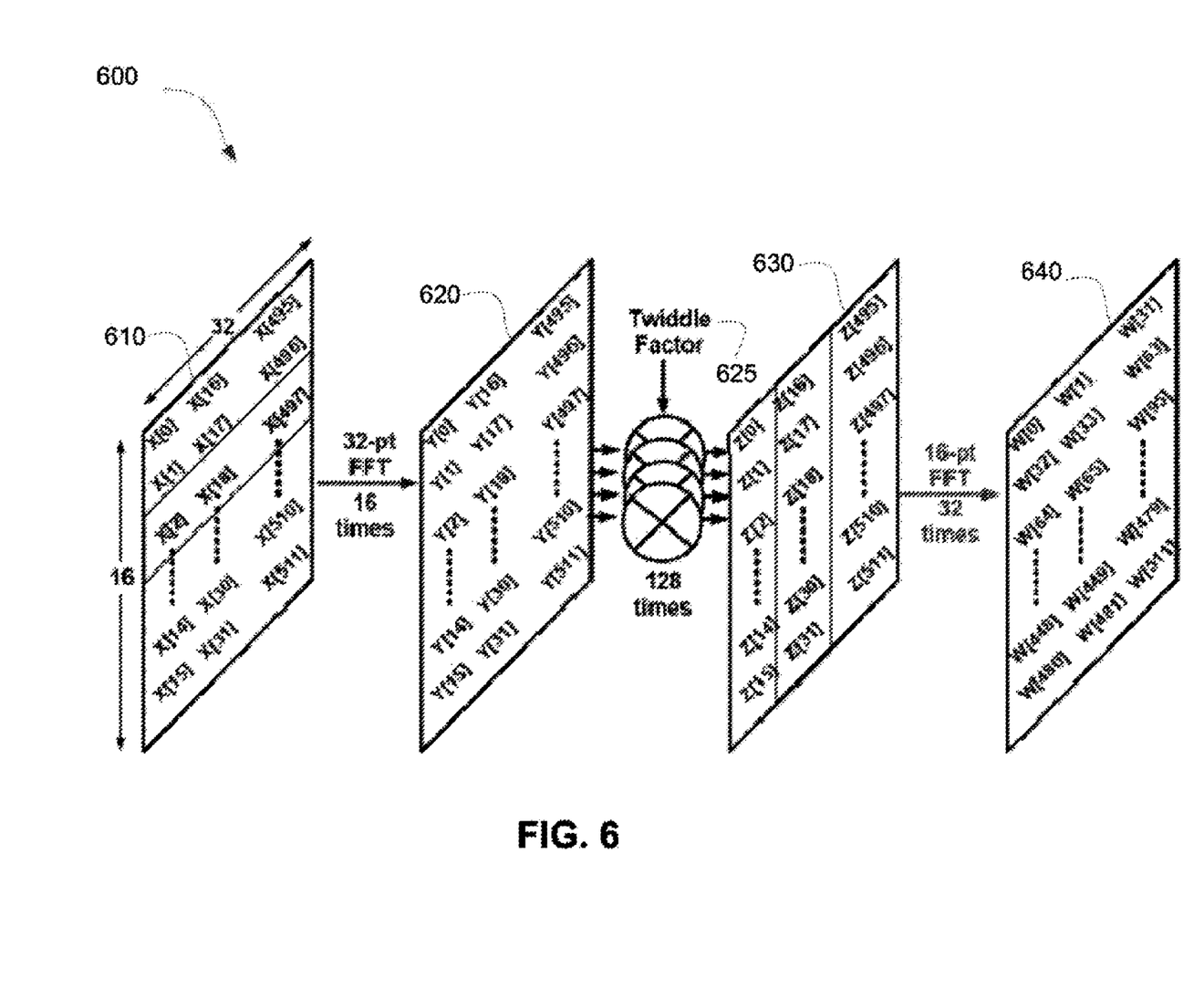
FIG. 6 is a block diagram that illustrates an example 512-point Fast Fourier Transform according to an embodiment.

Turning to FIG. 6, there is a block diagram that illustrates a 512-point Fast Fourier Transform. Diagram 600 includes four planes: X plane 610, Y plane 620, Z plane 630 and W plane 640. The X plane 610 may have 16 rows and 32 columns for a total of 16×32=512 information points. The information points in the X plane 610 may correspond to the information received by the FFT module 525 from the memory modules 510 and 515 illustrated in FIG. 5.

For some embodiments, the 512 information points in the X plane 610 may be transformed using 32-point FFT operations. Since there are 16 rows in the X plane 610, the 32-point FFT operations may be performed 16 times. The results of each 32-point FFT operations on the to information points of each row of the X plane 610 are illustrated in the corresponding row in the Y plane 620. For example, the results of the 32-point FFT operation on the information points in the first row (X(0), X(16), . . . , X(495)) of the X plane 610 are reflected in the first row (Y(0), Y(16), . . . , Y(495)) of the Y plane 620.

The FFT operations may be based on complex numbers, each with a real part and an imaginary part. The information points in the X plane 610 may include real information and not any imaginary information because it may represent real audio input signal. The X plane 610 may be referred to as a real plane. However, the information points in the Y plane 620 may include both the real parts and the imaginary parts. The Y plane 620 may be referred to as a complex plane. The information points in the Y plane 620 may then be multiplied with a set of imaginary twiddle factors 625. This twiddle factor 625 may correspond to the multiplication operations performed by the multiplication and filtering module 520 illustrated in FIG. 5. For some embodiments, the twiddle factor 625 may include four complex multipliers operating in parallel. Since there are 512 information points in the Y plane 620, there may be 128 multiplication cycles to obtain 512 information points for the Z plane 630. The Z plane 630 may be referred to as a complex plane.

For some embodiments, the information points in the Z plane 630 may be transformed using 16-point FFT operations. This may be performed by applying the 16-point FFT operations to the information points (e.g., Z(0), Z(1), . . . , Z(15)) in each column of the Z plane 630. Since there are 32 columns in the Z plane 630, the 16-point FFT operations may be performed 32 times. The results of each 16-point FFT operations on the information points of each column of the Z plane 630 are reflected in the corresponding column of the W plane 640. For example, the results of the 16-point FFT operations on the information points in the first column (Z(0), Z(1), . . . , Z(15)) of the 7 plane 630 are reflected in the first column (W(0), W(32), . . . , W(480)) of the W plane 640.

Figure 7:
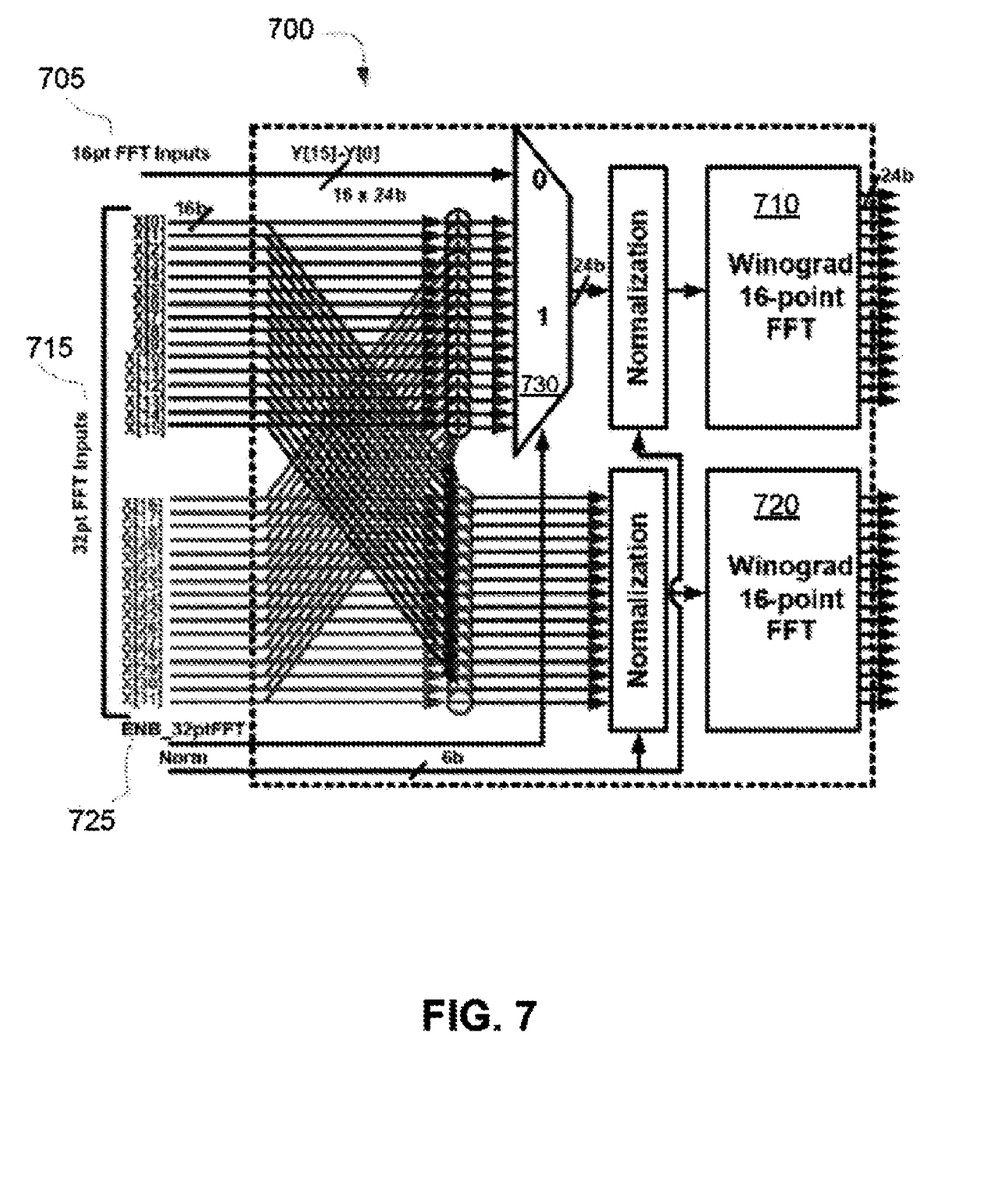
FIG. 7 is a block diagram that illustrates an example hardware implementation of a Fast Fourier Transform module according to an embodiment.

Turning to FIG. 7, there is a block diagram that illustrates an example hardware implementation of a Fast Fourier Transform module. FFT module 700 may be referred to as a hybrid FFT module because it may be used to perform both the 32-point FFT and 16-point FFT operations. The FFT module 700 may correspond to the FFT module 525 illustrated in FIG. 5. The decomposition of the 512 information points illustrated in FIG. 5 may be suited for audio, voice, or speech processing because these applications may be appropriate for operations performed in series. For example, the decomposition of the 512 information point may include using the 32-point FFT operations (16 times) followed by 512 complex multiplications and finally followed the 16-point FFT operations (32 times). This may be slower than performing the 512-point FFT operations of all the information points in the X plane 610 in parallel.

In order to have low power operation at low frequencies (e.g., 4 MHz), it may be necessary to reduce as much hardware as possible. It may be noted that most of the power at such low frequencies is in leakage, and hence a correct balance between active and leakage power may be obtained by having the operations performed in series using the same hardware. For some embodiments, instead of having two separate FFT modules—one for the 32-point FFT operations, and the other for the 16-point FFT operations—the FFT module 700 may be used to perform both of the 32-point and 16-point FFT operations. The FFT module 700 may include two 16-point FFTs 710 and 720. The 16-point FFTs 710 and 720 may be configured to operate in parallel.

The first 16-point FFT 710 may be associated with the 16-point FFT inputs 705 and its signals Y(0) to Y(15), or it may be associated with the first input 16 signals X(0) to X(15) of the 32-point FFT inputs 715. The second 16-point FFT 720 may be associated with the next 16 input signals X(16) to X(31) of the 32-point FFT inputs 715.

One of the 16-point FFTs 710 and 720 inside the FFT module 700 may be exposed to a control signal 725. The control signal 725 may be coupled with the multiplexer 730. When the control signal 725 is in a first setting (e.g., 0), it may cause the multiplexer 730 to accept the input signals 705 and in turn causing the FFT module 700 to operate as a 16-point FFT module. When the control signal 725 is in a second setting (e.g., 1), it may cause the multiplexer 730 to accept the input signals 715 and in turn causing the FFT module 700 to operate as a 32-point FFT module.

By using the FFT module 700 instead of having a separate 32-point FFT module and a 16-point FFT module, the total number of adders may be reduced from about 9500 to about 8300, and the total number of multipliers may be reduced from about 312 to about 56. This may provide significant power and area savings, at a potential and acceptable cost of latency.

Figure 8:
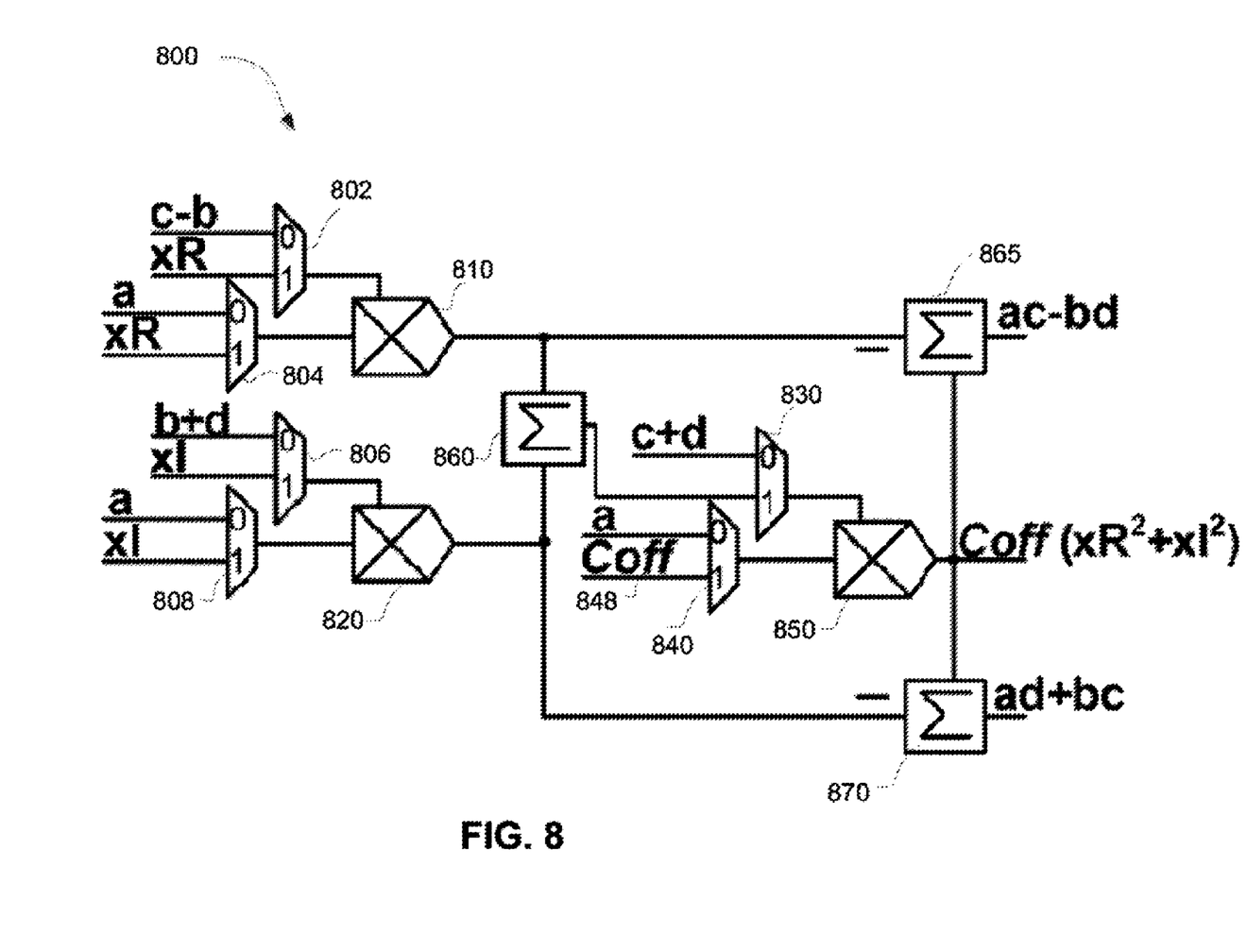
FIG. 8 is a diagram that illustrates an example hardware implementation of a multiplication and filtering module according to an embodiment.

Turning to FIG. 8, there is a diagram that illustrates an example hardware implementation of a multiplication and filtering module. The multiplication and filtering module 800 may be configurable to perform both the complex multiplication operations and the filtering operation. For some embodiments, the complex multiplication operations of FIG. 8 may be used as part of the twiddle factor illustrated in FIG. 6. For some embodiments, the filtering operation of FIG. 8 may be performed after the FFT operations. The multiplication and filtering module 800 may correspond to the multiplication and filtering module 520 illustrated in FIG. 5.

The multiplication and filtering module 800 may be configured to perform a complex multiplication of two complex numbers: (a+jb) and (c+jd). Conventionally, the multiplication to of these two complex numbers are performed as follows:

$$X=a+jb$$

$$Y=c+jd$$

$$Z=X*Y=(ac+bd)+j(ad+bc)$$

where X and Y are the input signals and Z is the output signal. To perform the above multiplication, four (4) multipliers and two (2) adders may be needed using the conventional technique. This complex number multiplication may be performed using four complex multipliers operating in parallel. Following is some examples of hardware-related information when using the convention technique to perform the above operations:

Logic levels=52
Leaf cells=3264

For some embodiments, using a modified technique, the multiplication of the same two complex numbers may be performed as follows:

$$X=a+jb$$

$$Y=c+jd$$

$$(ac-bd)=a(c+d)-a(d+b) \text{ (here the terms ``ad'' cancel each other out)}$$

$$(ad+bc)=a(c+d)-a(c-b) \text{ (here the terms ``ac'' cancel each other out)}$$

$$Z=X*Y=(ac+bd)+j(ad+bc).$$

To perform the above multiplication, three (3) multipliers and five (5) adders may be needed. It may be noted that, in comparison with the conventional technique, the number of multipliers in the modified modification is less but the number of adders is more. This may be acceptable because a multiplier is more expensive than an adder in terms of power, area, etc. Following is some examples of hardware-related information when using the modified technique to perform the above operations:

Logic levels=53
Leaf cells=2848 (here the number of cells is less than conventional technique)

Referring to FIG. 8, the three multipliers include multipliers 810, 820 and 850. The five adders include adders 860, 865, 870, and the two adders for the expression "c−b" and "b+d" at the input end. The input signals to the multiplication and filtering module 800 may be sent to a set of multiplexers 802, 804, 806 and 808. When these multiplexers are set to one value (e.g., zero), the multiplication and filtering module 800 may be configured to perform the complex multiplication operations. For example, from the first multiplexer, the phrase "c−b" may be passed through to the multiplier 810. From the second multiplexer 804, the signal "a" may be passed through to the multiplier 810, enabling the multiplier 810 to generate a result for the expression "a (c−b)". From the third multiplexer 806, the expression "b+d" may be passed to through to the multiplier 820. From the fourth multiplexer 808, the signal "a" may be passed through to the multiplier 820, enabling the multiplier 820 to generate a result for the expression "a (b+d)". The results from the multipliers 810 and 820 may then be used by the adders 860, 865 and 870 to generate a final result for Z as X*Y=(ac+bd)+j(ad+bc).

The multiplication and filtering module 800 may be set to perform filtering operations when the multiplexers 802, 804, 806 and 808 are set to another value (e.g., one). In this case, the multiplication and filtering module 800 may be configured to perform the filtering on the square of the absolute value of the expression "Coff*abs (xR+jxI)*abs (xR+jxI))" from the FFT operations, where "xR+jxI" is a complex number, "abs" is the absolute function, and "Coff" is a coefficient. The mathematical equivalence of this expression is "Coff $(xR^2+xI^2)$". This expression is illustrated on the right side of FIG. 8. The inputs xR and xI are illustrated as inputs to the multiplexers 802, 804, 806 and 808. The first multiplier 810 may then generate a result for "$xR^2$" and the second multiplier 820 may generate a result for "xI$^2$". These results may then be used to generate a value for the expression "Coff (xR$^2$+xI$^2$)" using the coefficient 848, the multiplexer 840, and the multiplier 850.

Figure 9:
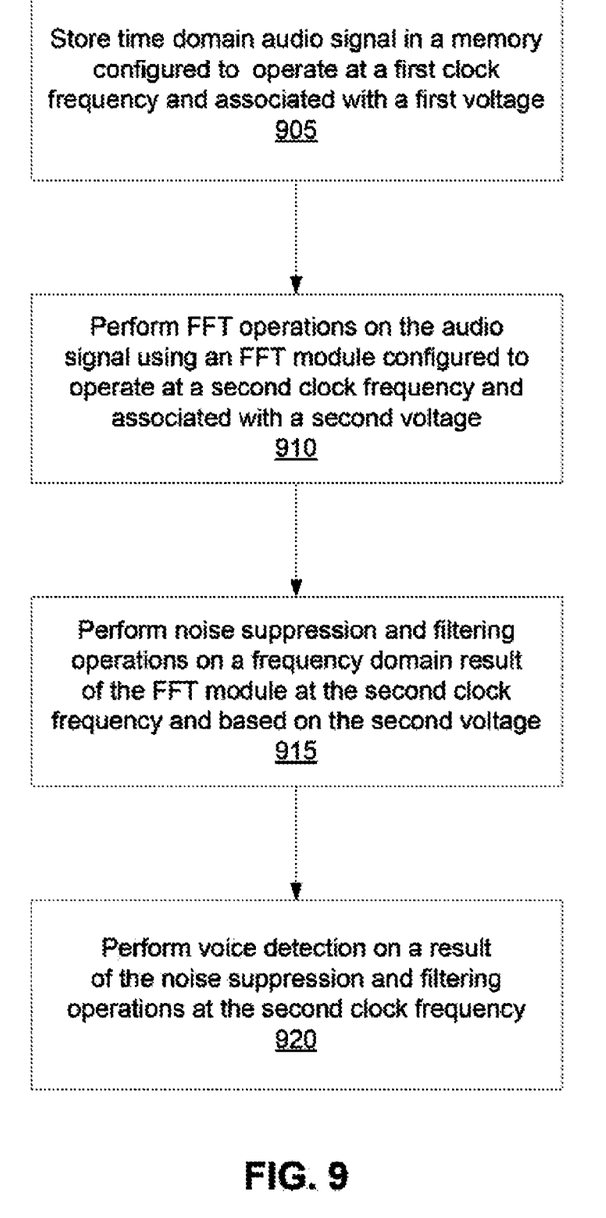
FIG. 9 is a flowchart of an example method of processing audio signal to detect the human voice.

Turning now to FIG. 9, a method of processing the audio signal to detect the human voice is shown. The method may correspond to the hardware architecture shown in FIG. 5. The method may be implemented as a set of logic instructions stored in a machine- or computer-readable storage medium such as RAM, ROM, PROM, flash memory, etc., in configurable logic such as PLAs, FPGAs, CPLDs, in fixed-functionality logic hardware using circuit technology such as ASIC, CMOS or TTL technology, or any combination thereof. For example, computer program code to carry out operations shown in the method may be written in any combination of one or more programming languages, including an object oriented programming language such as C++ or the like and conventional procedural programming languages, such as the "C" programming language or similar programming languages.

Block 905 provides for storing the audio signal into a memory. As mentioned, the audio signal may include the human voice and other noises, including the background noise. The audio signal may have been recorded by a recorder and may be stored in time domain. The memory may be configured to operate at a first clock frequency (e.g., high frequency). The memory may be configured to operate at a first voltage (e.g., high Vcc).

Block 910 provides for performing FFT operations on the audio signal to convert it from the time domain into the frequency domain. The FFT operations may be based on the frames associated with the audio signal. As mentioned, the frames may be determined using framing and windowing operations. The FFT operations may be performed by a configurable FFT to module that may be configured to operate as different types of FFT module (e.g., a 32-point FFT module or a 16-point FFT module). The configurable FFT module may operate at a second clock frequency (e.g., low frequency). The configurable FFT module may also operate at a second voltage (e.g., low Vcc).

Block 915 provides for performing the noise suppression and filtering operations on the frequency domain result of the FFT operations from the block 910 and based on the second voltage. The filtering operations may be performed using configurable the multiplication and filtering hardware illustrated in FIG. 8. The noise suppression operations may be performed using one or more noise suppression techniques as described with FIG. 3. The noise suppression and filtering operations of block 915 may operate at the second clock frequency (e.g., low frequency). The noise suppression and filtering operations may also operate at the second voltage (e.g., low Vcc).

Block 920 provides for performing voice detection after the noise suppression and filtering operations of block 915 are completed. One or more voice detection algorithms may be used as described in FIG. 5. Total energy and background noise in a frame may be used to determine the presence of the human voice. The voice detection operations of block 920 may operate at the second clock frequency (e.g., low frequency). The voice detection operations may also operate at the second voltage (e.g. low Vcc).

Embodiments of the present invention may be applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g. photolithography) mature over time, it is expected that devices of smaller size could be to manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
a transform component to operate between a first mode and a second mode, wherein the first mode is based on a first clock frequency and a first voltage, and wherein the second mode is based on a second clock frequency and a second voltage, and
logic to,
store a digital representation of a time-domain audio signal in a memory configured to operate based on the first clock frequency and the first voltage, wherein the memory is coupled to a first buffer that is coupled in series to a second buffer, transmit the time-domain audio signal to the second buffer via the first buffer, wherein the first buffer is configured to operate based on the first clock frequency and the first voltage, and wherein the second buffer is configured to operate based on the second clock frequency and the second voltage, and cause the transform component operating in the second mode to perform Fast Fourier Transform (FFT) operations on the time-domain audio signal to generate a frequency-domain audio signal, wherein the first clock frequency is to be faster than the second clock frequency, wherein the transform component operating between the first mode and the second mode obtains a balance between active and leakage power.

2. The apparatus of claim 1, wherein the logic is further to:
cause the transform component operating in the first mode to perform a first set of FFT operations,
perform complex number multiplication operations, and
cause the transform component operating in the second mode to perform a second set of FFT operations in series with the first set of FFT operations.

3. The apparatus of claim 2, wherein the second voltage is to be lower than the first voltage.

4. The apparatus of claim 3, wherein the logic is to:
perform noise suppression operations, and
perform filtering operations on the frequency-domain audio signal based on the second clock frequency and the second voltage to generate an enhanced audio signal.

5. The apparatus of claim 4, wherein the complex number multiplication operations and filtering operations are to be implemented using a same hardware component.

6. The apparatus of claim 4, wherein the logic is to perform human voice detection operations on the enhanced audio signal based on the second clock frequency and the second voltage.

7. The apparatus of claim 6, wherein the logic is to determine total energy in a frame of the enhanced audio signal, and to determine background noise in the frame of the enhanced audio signal.

8. The apparatus of claim 7, wherein the logic is to perform median filtering operations, and perform contour tracking operations.

9. The apparatus of claim 7, wherein the logic is to execute a command associated with the detected human voice based on the first clock frequency and the first voltage.

10. A computer-implemented method comprising:
recording a digital representation of a time-domain audio signal in a memory at a first clock frequency and a first voltage for a first mode, wherein the memory is configured to operate based on the first clock frequency and the first voltage, and wherein the memory is coupled to a first buffer that is coupled in series to a second buffer;
transmitting the time-domain audio signal to the second buffer via the first buffer; and
performing Fast Fourier Transform (FFT) operations, using a transform component, on the digital representation of the time-domain audio signal at a second clock frequency for a second mode to generate a frequency-domain audio signal, wherein the first buffer is configured to operate based on the first clock frequency and the first voltage, wherein the second buffer is configured to operate based on the second clock frequency and the second voltage, wherein the first clock frequency is faster than the second clock frequency, and wherein the FFT operations operating between the first mode and the second mode obtain a balance between active and leakage power.

11. The method of claim 10, wherein the FFT operations are performed at a second voltage for the second mode that is lower than the first voltage for the first mode.

12. The method of claim 11, further including:
performing noise suppression operations on the frequency-domain audio signal at the second clock frequency and the second voltage to generate an enhanced audio signal.

13. The method of claim 12, further including:
performing voice detection operations on the enhanced audio signal at the second clock frequency and the second voltage to detect human voice.

14. The method of claim 13, wherein performing the human voice detection operations includes:
determining total energy in a frame of the enhanced audio signal;
determining energy associated with background noise in the frame of the enhanced audio signal; and
detecting the human voice by subtracting the energy associated with the background noise from the total energy in the frame of the enhanced audio signal.

15. The method of claim 13, further including:
executing a command associated with the human voice at the first clock frequency and the first voltage.

16. The method of claim 15, wherein the time-domain audio signal is recorded continuously and converted from Pulse Density Modulation (PDM) to Pulse-code modulation (PCM) at the first clock frequency and the first voltage.

17. The method of claim 16, wherein the FFT operations are performed in series.

18. A non-transitory computer readable storage medium comprising a set of instructions which, if executed by a processor, cause a computer to:
record a digital representation of a time-domain audio signal to a memory at a first clock frequency and a first voltage for a first mode, wherein the memory is configured to operate based on the first clock frequency and the first voltage, and wherein the memory is coupled to a first buffer that is coupled in series to a second buffer;
transmit the time-domain audio signal to the second buffer via the first buffer; and
perform Fast Fourier Transform (FFT) operations on the digital representation of the time-domain audio signal at a second clock frequency for a second mode to generate a frequency-domain audio signal, wherein the first buffer is configured to operate based on the first clock frequency and the first voltage, wherein the second buffer is configured to operate based on the second clock frequency and the second voltage, wherein the first clock frequency is to be faster than the second clock frequency, and wherein performing the FFT operations between the first mode and the second mode obtain a balance between active and leakage power.

19. The medium of claim 18, wherein the FFT operations are to be performed at a second voltage for the second mode lower than the first voltage for the first mode.

20. The medium of claim 19, further comprising a set of instructions which, if executed by the processor, cause the computer to:

perform noise suppression operations on the frequency-domain audio signal at the second clock frequency and the second voltage to generate an enhanced audio signal;

perform voice detection operations on the enhanced audio signal at the second clock frequency and the second voltage to detect human voice; and execute a command associated with the human voice at the first clock frequency and the first voltage.

21. The medium of claim 20, wherein the voice detection operations are to be performed by determining total energy in a frame of the enhanced audio signal, determining energy associated with background noise in the frame of the enhanced audio signal, and detecting the human voice by subtracting the energy associated with the background noise from the total energy in the frame of the enhanced audio signal.

22. The medium of claim 21, wherein the time-domain audio signal is continuously recorded at the first clock frequency and the first voltage.

23. A system comprising:
a pre-processing module configured to capture audio signals in a memory as Pulse Density Modulation (PDM) information streams and to convert the PDM information streams into Pulse Code Modulation (PCM) information streams based on a first clock frequency and a first voltage for a first mode, wherein the memory is configured to operate based on the first clock frequency and the first voltage, and wherein the memory is coupled to a first buffer that is coupled in series to a second buffer;
a frontend processing module coupled to the pre-processing module and configured to frame and window the PCM information streams into multiple frames; and
a Fast Fourier Transform (FFT) module coupled to the frontend processing module and configured to receive the frames of the PCM information streams, via the first buffer coupled in series to the second buffer, and perform a transformation of the frames from the time-domain representation into a frequency-domain representation based on a second clock frequency and a second voltage for a second mode, wherein the first buffer is configured to operate based on the first clock frequency and the first voltage, wherein the second buffer is configured to operate based on the second clock frequency and the second voltage, wherein the second clock frequency is different from the first clock frequency and the second voltage is different from the first voltage, wherein the first clock frequency is to be faster than the second clock frequency, and wherein the FFT module operates between the first mode and the second mode to obtain a balance between active and leakage power.

24. The system of claim 23, wherein the second voltage for the second mode is lower than the first voltage for the first mode.

25. The system of claim 24, further including:
a noise estimation and suppression module coupled to the FFT module and configured to analyze the frames in the frequency-domain representation and to filter out noise information that is not within a same band as human voice;
a human voice detection module coupled to the noise estimation and suppression module and configured to use a background noise estimation to determine whether there is a presence of the human voice in the frames based on a human voice band; and
a voice processing module coupled to the human voice detection module and configured to determine a command associated with the human voice and to perform operations associated with the command.

* * * * *